Figure 1:
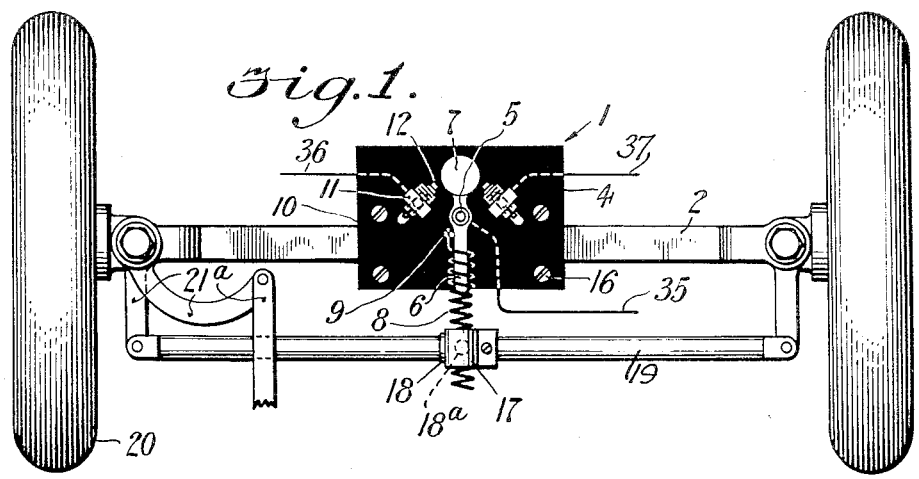

Jan. 28, 1936.　　　　　P. A. SCHWARTZ　　　　　2,029,130
SWITCH MECHANISM
Filed April 8, 1931

INVENTOR
Paul A. Schwartz
BY Walter J. Gill,
ATTORNEY

Patented Jan. 28, 1936

2,029,130

UNITED STATES PATENT OFFICE 2,029,130

SWITCH MECHANISM

Paul A. Schwartz, Flushing, N. Y.

Application April 8, 1931, Serial No. 528,545

2 Claims. (Cl. 200—59)

The invention relates to vehicle direction signals for automatically indicating by visual signal a turning movement or a cessation of movement of a vehicle.

Systems for indicating turning movements or cessation of movement of a vehicle have been proposed. These systems are either hand operated or are automatically operated by the movement of the steering wheel. The manual systems are impracticable as they merely indicate the intention of the operator and when used by careless or easily confused operators are a source of danger. For, unless the proper signal is given, the operator's intention actually carried into effect, and the system restored to the neutral condition at the end of the movement, the system may indicate no turning movement when a turning movement is intended, a movement opposite to that intended, or a movement when none is intended. The previously proposed automatic systems are an improvement over the manual systems since in their use the human element is not a factor but they too are not practicable. It is well known that a considerable amount of play or free motion exists between the steering wheel and the front wheels of motor vehicles. Because of this lost motion the proposed automatic systems can be made to indicate with any degree of accuracy only pronounced turning movements; if it is attempted to arrange them to indicate small turning movements they are not accurate and like the manual systems may indicate a turn when none is taking place or is intended, a wrong turn, or continuance on the straight course when a turn is actually being made. Thus they have only a very limited utility under modern traffic conditions where most of the turning movements made in jockeying through traffic are small movements.

For maximum safety it is highly desirable that the operator of the vehicle as well as the operators of other vehicles be at all times accurately informed as to the direction in which the front wheels of the vehicle are pointing. Such information would not only help to prevent the ordinary collisions with other vehicles but would also help to avoid the serious accidents which often follow when a vehicle suddenly goes into a skid. In the previously proposed automatic systems the visual signal is so located as to be out of the view of the operator of the vehicle and no attempt is made to furnish him with the information that is signalled. With such information parking and starting from a curb are also greatly facilitated.

It is an object of this invention to provide a simple and rugged switch mechanism that is adapted to be operatably connected to the steering mechanism of a motor vehicle and to an electrically operated visual signalling device, the switch mechanism being such that the visual signalling device will be automatically operated to indicate turning movements of the front wheels of the vehicle of predetermined magnitude.

Figure 2:
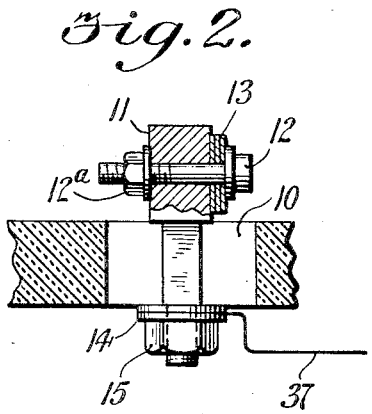

The particular nature of the invention as well as other objects and advantages thereof will appear most clearly from a description of a preferred embodiment thereof as shown in the accompanying drawing, in which, Fig. 1 is a plan view of the front wheel assembly of the vehicle showing the construction and location of the switch mechanism, Fig. 2 is a sectional view showing details of one of the contact elements.

Proceeding now to a description of the drawing wherein like parts are similarly designated, and referring particularly to Figs. 1 and 2 thereof, a switch mechanism 1 is shown mounted on the front axle 2 of the vehicle 3. The switch mechanism 1 comprises a rectangular block 4 of insulation material at the center of which is a pivot 5 mounting a contact lever 6 which terminates at one end in a circular movable contact element 7. A helical spring 8 encircles the other end of contact lever 6 and is fastened to a pin 9 attached thereto. On each side of the center line of block 4, which the contact lever 6 overlies in its neutral position, is a diagonal slot 10. These slots 10 are perverse images of each other with reference to the mentioned center line and each receives a member 11 that is carried by the block. Each member 11 mounts a fixed contact element 12, see Fig. 2. For so doing the member 11 has an upper enlarged portion centrally bored to accommodate the shank of the contact element 12, which has a threaded end. A plurality of spacing washers 13 are disposed on the shank of contact element 12 between its head and a contiguous face of the enlarged portion or head of the member 11 to space the head of the contact member 12 a desired distance from that face. A nut 12a screws on the shank of contact element 12 and serves to securely position it. The shank of the member 11 is preferably rectangular as it extends through the slot 10 to prevent turning of the member, and is threaded as it extends below block 4. It carries washers 14 and nut 15, the nut and threaded portion of the shank cooperating with the enlarged head of the member 11 to hold the latter against movement in any position of adjustment in groove 10.

Washers 14 and nut 15 also serve to position one end of conduits 36 and 37.

Again referring to Fig. 1, block 4 is provided with a plurality of holes to accommodate screw bolts 16 which cooperate with axle encircling members, not shown, to securely position the switch mechanism 1 on the axle 2. The other end of helical spring 8 is encircled by a sleeve 17 which is pivoted to a sleeve 18 encircling the tie-bar 19 of the vehicle by means of pivot 18a. Tie bar 19 is connected to the front wheels 20, one of which is rocked by steering wheel 21 and associated mechanism 21a of the vehicle in the usual manner.

Conduits 36 and 37 are connected to one terminal of separate light sources of a visual signal device not shown, the other terminal being connected to a source of electrical energy, as a storage battery, also not shown. The other terminal of the storage battery or other source of electrical energy is connected thru conduit 35 to the contact lever 6 of switch mechanism 1.

In assembling the switch mechanism, as shown, the aforementioned centerline of switch 1 is located directly over the middle of axle 2 and the pivot 18a of sleeve 17 is located directly over the middle of tie-bar 19. With this disposition of the parts, movable contact 7 is moved the same distance from its central or neutral position to the left and to the right by equal left hand and right hand turning movements of the vehicle 3. This disposition of the parts is convenient but not essential for the same result may be obtained by positioning switch 1 anywhere on axle 2 providing the pivot of sleeve 17 is correspondingly located on tie-bar 19.

Slots 10 and spacing washers 13 are provided to enable the system to be adjusted to signal turning movements of a desired magnitude. These adjusting means also enable the system to be adjusted as required by the pecularities of the front wheel assembly of different makes and types of vehicles. To adjust the system after it is assembled on the vehicle in accordance with the above description the wheels are turned from the straight course position through an angle which corresponds to the minimum turning movement to be signalled. The proper member 11 is then moved in its slot 10 until element 12 contacts to close the circuit of its respective light bulb. The other element 10 is then like positioned in its slot 10. This adjustment may be made permanent and all subsequent small adjustments made by adding or removing the necessary member of spacing washers 13. To further facilitate adjustment these spacing washers 13 may be made of a thickness to correspond to a definite number of degrees of movement of the front wheels. Other means of adjusting the contact elements 12 may be employed, as by threading their shanks into the enlarged portions of the members 11 and securing the elements in place with lock-washers.

The operation of the system is as follows: As the operator turns the steering wheel in either direction to execute a turning movement the left hand front wheel will be turned thus moving the tie-bar 19 and turning the right hand wheel with it. The movement of the tie bar will be communicated through sleeves 17, 18 and helical spring 8 to the control lever 6 so as to move contact element 7 toward the fixed contact element 12. When the turning movement has reached the magnitude of the movements to be signalled, contact element 7 will engage the proper contact element 12 and will close the circuit of the proper light bulb. If the magnitude of the movement is increased and the tie-bar 19 further moved no greater force is applied at lever 6 for after lever 6 is held from further movement by the engagement of the contact elements 7 and 12, helical spring 8 will bend.

The system is also useful as a "shimmy" detecting device for by properly positioning contact elements 12 relative to movable contact 7 it can be made to signal movements of wheels 20 of magnitudes which cannot be otherwise detected.

While a preferred embodiment has been shown and described, it is understood that the invention may be embodied in other forms, and various changes may be made without departing from its principle as defined in the appended claims.

I claim:

1. In a selective switch for electrical circuits adapted to be operated by a shiftable member connected to steering mechanism, a basic support, normally fixed electrical contacts mounted thereon, a movable electrical contact pivotally mounted on said basic support between said fixed contacts and having an operating arm, and yielding actuating means for said operating arm comprising a flexible member overlapping said arm in mutually retentive relationship therewith to angularly displace said arm and an automatically adjustable connector for attachment to the shiftable member to be movable therewith to apply force to said flexible member laterally thereof.

2. In an electric switch adapted to be operated by a tie-rod connected to dirigible wheels of an automobile, a basic support, normally fixed electrical contacts mounted on said basic support, a movable electrical contact pivotally mounted on said basic support between said fixed contacts for engagement with either of them, said movable contact being provided with an operating arm, and actuating means for said operating arm comprising a sleeve provided with means to attach it to the tie-rod, a second sleeve pivotally connected to the first mentioned sleeve and a helical spring having opposite end portions respectively telescoped with the second mentioned sleeve and said operating arm.

PAUL A. SCHWARTZ.